United States Patent [19]
Ainslie et al.

[11] Patent Number: 5,594,578
[45] Date of Patent: Jan. 14, 1997

[54] OPTICAL COMMUNICATIONS SYSTEM INCLUDING DOPED OPTICAL FIBER FILTER

[75] Inventors: Benjamin J. Ainslie, Suffolk; Iain J. Wilkinson, Birmingham; Timothy Finegan, Ipswich, all of England

[73] Assignee: British Telecommunications public limited company, London, England

[21] Appl. No.: 75,459

[22] PCT Filed: Dec. 11, 1991

[86] PCT No.: PCT/GB91/02197

§ 371 Date: Aug. 25, 1993

§ 102(e) Date: Aug. 25, 1993

[87] PCT Pub. No.: WO92/10887

PCT Pub. Date: Jun. 25, 1992

[30] Foreign Application Priority Data

Dec. 11, 1990 [GB] United Kingdom ............. 9026898

[51] Int. Cl.$^6$ ................. H04J 14/02; H04B 10/12
[52] U.S. Cl. ........... 359/127; 359/114; 359/173; 385/24
[58] Field of Search .................. 359/173, 124, 359/127, 114, 125; 372/6; 385/24, 140, 142, 27

[56] References Cited

U.S. PATENT DOCUMENTS

| | | | |
|---|---|---|---|
| 4,342,499 | 8/1982 | Hicks | 359/127 |
| 4,460,241 | 7/1984 | Cohen | |
| 4,881,793 | 11/1989 | Tarbox | 385/140 |
| 5,131,069 | 7/1992 | Hall | 372/6 |
| 5,216,728 | 6/1993 | Charlton | 372/6 |
| 5,245,467 | 9/1993 | Grasso | 372/6 |
| 5,321,774 | 6/1994 | Barnard | 385/16 |
| 5,363,234 | 11/1994 | NewHouse | 372/6 |

FOREIGN PATENT DOCUMENTS 0356951  7/1990  European Pat. Off. .

OTHER PUBLICATIONS

"Design of Passive Optical Networks," M. H. Reeve et al, Br. Telecom. Technol. J. vol. 7, No. 2, Apr. 1989, pp. 89–99.

"Performance of Erbium–Doped Fibre Amplifier in 16–Channel Coherent Broadcast Network," Welter et al, Electronics Letters, 28 Sep. 1989, vol. 25, No. 20, pp. 1333–1335.

"Multiwavelength CW Laser Oscillation in a $Nd^{3+}$ and $Er^{3+}$ Doubly Doped Fiber Laser," Y. Kimura et al, Appl. Phys. Lett. 53 (14) 3 Oct. 1988, pp. 1251–1253.

"Neodymium–Doped Silica Lasers in End–Pumped Fiber Geometry," J. Stone et al, Appl. Phys. Lett., vol. 23, No. 7, 1 Oct. 1973, pp. 388 and 389.

"The Fabrication, Assessment and Optical . . . of High–Concentration $Nd^{3+}$— and $Er^{3+}$— Doped Silica–Based Fibers," Ainslie et al, Materials Letters, vol. 6, No. 5.6, Mar. 1988, pp. 139–144.

"Low–Loss Joints Between Dissimilar Fibres by Tapering Fusion Splices," Mortimore et al, Electronics Letters, 13 Mar. 1986, vol. 22, No. 6, pp. 318 and 319.

"Broadband Systems on Passive Optical Networks," Faulkner et al, Br. Telecom. Technol. J. vol. 7, No. 2, Apr., 1898, pp. 115–122.

"The Provision of Telephony Over Passive Optical Networks," Hoppitt et al, Br. Telecom. Technol. J. vol. 7, No. 2, Apr. 1989, pp. 100–114.

Electronics Letters, vol. 26, No. 9, pp. 605–607, 26 Apr. 1990.

Electronics Letters, vol. 25, No. 14, pp. 890–892, 6 Jul. 1989.

(List continued on next page.)

Primary Examiner—Leslie Pascal
Attorney, Agent, or Firm—Nixon & Vanderhye, P.C.

[57] ABSTRACT

An optical telecommunications system suitable for operation as a wavelength division multiplex, which system contains at least one filter for attenuating signals at wavelength which are unwanted at a location of the filter, characterized in that the filter comprises an optical fiber which contains a dopant adapted to absorb the unwanted signals.

31 Claims, 2 Drawing Sheets

OTHER PUBLICATIONS

*IEEE Global Telecommunications Conference & Exhibition,* vol. 1, No. 1.1, pp. 1–9, 27 Nov. 1989.

*IEEE Photonics Technology Letters,* vol. 2, No. 1, pp. 35–37, Jan. 1990.

*Electronics Letters,* vol. 25, No. 9, pp. 594–595, 27 Apr. 1989.

PCT Search Report, European Patent Office, completed 16 Mar. 1992.

OPTICAL COMMUNICATIONS SYSTEM INCLUDING DOPED OPTICAL FIBER FILTER

The present invention relates to optical communications systems and in particular to systems in which a plurality of wavelengths are used to provide distinct communications channels over single optical fibres.

As the use of optical fibres becomes more widespread there is an increasing desire and need to use more of the potential bandwidth of the fibres. A favoured way of improving the use of the available bandwidth is to use multiple wavelengths on a single fibre, the different wavelengths each providing a different distinct communications channel. This is usually called "Wavelength Division Multiplex" or "WDM".

The increasing use of WDM optical fibre systems means that there is likely to be an increasing need to separate the wavelengths each into its own different fibre. This separation can be achieved by a wavelength sensitive splitter often known as a "demodulator" or "DMX". It should be noted that systems will also comprise splitters which are not wavelength sensitive in order to permit two-way communication along the same fibre.

British Telecom's passive optical network (PON) [described in British Telecom Technology Journal, 1989, Volume 7, pp 89–99] is an example of an optical fibre communications system which utilises optical filters. The PON approach aims to reduce the cost of providing small businesses and residential users with direct access to an optical fibre network by using the fibre bandwidth to share one fibre amongst a plurality of customers, reducing the amount of plant in the ground and also sharing the exchange equipment. The 'passive' element comes from the desire to eliminate the need for street-mounted electronics, hopefully restricting active elements to the exchange and customers' premises. A time division multiplexed (TDM) signal is broadcast to all terminals from the exchange on a single wavelength i.e. the telephony wavelength, with the customer time accessing the particular bits meant for him. In the return direction, data from the customer is inserted at a predetermined time to arrive at the exchange in synchronism with other customers' data. Inclusion of an optical filter in the customer's terminal that passes only the telephony wavelength allows the later provision of new services on other wavelengths without disturbing the telephony transmission. In a field trial which is currently under way, a single exchange fibre has a 128 way split operating at 20 Mbit/s to provide ISDN services to all customers.

As mentioned above the TDMX system uses a single wavelength and the capacity of the system can be further increased, e.g. to incorporate cable TV, by using a WDM. Depending upon the system requirements, each wavelength channel of the WDM may also operate as TDMX. Such systems are based on the concept of providing a separate wavelength range for each of telephony (TPON), broadband services (BPON), and maintenance. In the aforementioned trial, telephony uses the 1.3 μm window, which ranges between 1.26 and 1.34 μm, since lasers in this wavelength range are cheaper than those in the 1.55 μm window. The 1.55 μm window is divided into four channels at 1.50 μm, 1.525 μm, 1.55 μm and 1.575 μm. Of these the longest is assigned to maintenance whilst the others are available for broadband services. The channels are sufficiently far apart to allow a 15 nm band-pass filter to accept one and reject the others. A 15 nm filter bandwidth is compatible with DFB lasers. The 25 nm spacing between the channels is consistent with that available from commercial gratings WDMs which could be used to separate broadband channels.

It has been proposed to provide each telephony customer with a filter which passes only the telephony wavelengths. Currently that filter is a multilayer dielectric interference filter on a thin (100 μm) silicon substrate. The 1 mm square filters are mounted in a precision machined slot cut through a ceramic fibre-connector ferrule, with signal fibres inserted from both ends. The filter is 'sandwiched' between the fibre ends, with a typical loss at 1.00 nm of about 1.5 dB. The filter's attenuation from 1500 to 1600 nm is typically 20 dB. Unfortunately, such a filter design is likely to generate unwanted reflections which are fed back into the network where they can cause serious problems. Spurious reflections are likely to be particularly problematic in networks which include optical amplifiers. The use of optical amplifiers, such as erbium doped fibre amplifiers, in branched networks is an attractive way of dealing with losses at splitters and multiplexers (see for example the paper by R Welter et al, Electronics Letters, Vol 25, No. 20, 1989, pp 1333–1335). Unfortunately, stray reflections in such systems could lead to lasing, with possible damage to or failure of the system.

As an alternative to the use of discrete filters it has been proposed to form multilayer interference filters integrally with the optical detectors used in receivers. A disadvantage of this approach is that it involves considerable extra processing of the already expensive detectors. Thus any manufacturing flaws introduced when applying the filters may significantly increase overall production costs by increasing wastage of 'finished' devices. Moreover a filter on the detector provides no protection for other components in the terminal equipment.

Others, in particular those working on PONs in Japan, are continuing to improve the discrete multilayer dielectric filters and the methods for their installation so that the level of reflection is much reduced.

The present invention proposes an alternative filter arrangement for use in optical communications systems and which overcomes, at least in part, these and other disadvantages of prior art filter arrangements.

According to this invention the filter comprises a doped optical fibre wherein the dopant is adapted to attenuate unwanted wavelengths. The doped fibre filters in accordance with the invention are particularly suitable for use in conjunction with wavelength-sensitive splitters, e.g. demodulators, in order to attenuate unwanted wavelengths, which result from imperfections in the performance of the demodulators.

Doped optical fibres are, of course known for use as fibre lasers or fibre laser amplifiers. Rare earth ions are commonly used in such lasers.

In the paper by Kimura and Nakazawa in Appl. Phys. Lett, Vol. 53, No. 14, 1988, pp 1251–1253, entitled "Multiwavelength cw laser oscillation in a $Nd^{3+}$ and $Er^{3+}$ doubly doped fibre laser", there is described a fibre laser in which a 1.5 m length of silicate glass fibre doped with 100 ppm of $Nd^{3+}$ and 900 ppm of $Er^{3+}$ is end-pumped with an argon ion laser at 514 nm. Multiwavelength laser oscillations at 0.908, 0.932, 1.08 and 1.552 μm were achieved with an adsorbed pump power of 70 mW. The absorption and fluorescence spectra for the fibre, which are of course of significance in the context of optical pumping and laser emission wavelengths respectively, are illustrated in a single graph. Absorption losses due to $Nd^{3+}$ ions were observed at 0.75, 0.81 and 0.9 μm corresponding to the $^4I_{9/2}$ ($^4F_{7/2}+^4S_{3/2}$), the $^4I_{9/2}$ ($^4F_{5/2}-^4H_{9/2}$), and the $^4I_{9/2}$ $^4F_{3/2}$ transition, respectively. Absorption peaks due to $Er^{3+}$ ions were observed at 0.81, 0.98 and 1.53 µm, which correspond to the $^4I_{15/2} \rightarrow {}^4F_{9/2}$, the $^4I_{15/2} \rightarrow {}^4I_{11/2}$, and the $^4I_{15/2} \rightarrow {}^4I_{13/2}$ transition, respectively.

However, it is clear that Kimura is solely concerned with the properties of such fibres insofar as they relate to fibre lasers. Hence the absorption spectrum of the fibre is only considered from the viewpoint of optical pumping of fibre lasers. Of course in use of a fibre laser in an amplifier regime the absorption spectrum will be quite different to that shown in FIG. 1 of Kimura's paper, since the object of using a fibre amplifier is to amplify, i.e. provide negative absorption for, input optical signals.

As far as the Applicants are aware, no one has ever considered the use of suitably doped optical fibres as optical filters. It is expected that, as in one of the embodiments described herein, optical fibres suitable for use as filters according to the present invention will have different compositions to those used in fibre lasers or fibre laser amplifiers. In particular, fibres suitable for use according to the present invention will normally contain greater dopant concentrations than are conventionally used in fibre lasers, or fibre laser amplifiers. Additionally or alternatively, where multiple dopants are used the ratios in which the dopants are used will, in fibre suitable for use according to the present invention, normally be different to the ratios previously used in fibre lasers or fibre laser amplifiers.

Furthermore, dopants not previously used in fibre lasers or fibre laser amplifiers can be expected to find application in optical fibres suitable for use according to the present invention.

According to a first aspect the present invention relates to an optical communications system which includes one or more fibre filters as described above.

According to a second aspect the present invention provides an optical communications system comprising a plurality of optical fibres carrying first and second optical wavelengths $\lambda_1$ and $\lambda_2$ to a multiplicity of subscribers' premises, an optical filter being provided at each of said multiplicity of subscribers' premises, said optical filter having a filter characteristic such that a first wavelength is passed substantially unattenuated and a second wavelength is substantially attenuated, characterised in that said filter comprises an optical fibre which is selectively doped to provide an absorption at $\lambda 2$ which is at least 10 dB or at least ten times that at $\lambda 1$.

(ii) a wavelength demultiplexer having two fibre tails constituting output ports for the separate wavelengths, wherein at least one of said fibre tails includes a fibre filter for attenuating wavelengths supplied to the other fibre tail.

Preferred embodiments of the present invention will now be described, by way of example only, with reference to the accompanying drawings in which.

Figure 1:
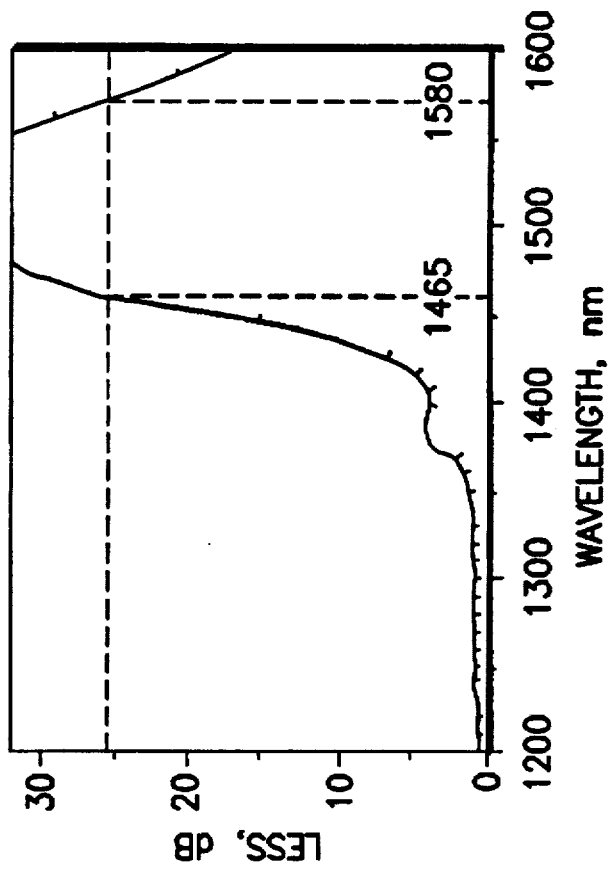
FIG. 1 is a plot of attenuation against wavelength for a fibre filter for use in the present invention.

The filters for use in the present invention are produced using conventional optical fibre production processes, and in particular processes of the type used in the production of rare-earth doped fibres for use as fibre lasers or fibre laser amplifiers.

A preferred fabrication technique uses the solution method, first proposed by Stone et al (Appl. Phys Lett. 23, 1973 p. 388) and described in the paper "The fabrication, assessment and optical properties of high concentration $Nd^{3+}$ and $Er^{3+}$ doped silica based fibres", by Ainslie et al, published in Materials Letters, Vol. 6, 1988, p139–146, which is herein incorporated by this reference. The core host glass composition should be chosen to give (i) a core/cladding index difference ($\Delta n$) to match that of the (standard) fibre to which the filter is to be spliced; and (ii) a high degree of solubility for absorber-dopant ions.

In silica based fibres the use of germania will tend unacceptably to increase $\Delta n$, and hence its use should normally be avoided. $Al_2O_3$ and $P_2O_5$, particularly in combination, tend to increase rare-earth solubility and hence, where absorption is to be provided by rare-earth ions, the use of these components together or separately is favoured. The use of a core host glass of $Al_2O_3$—$P_2O_5$—$SiO_2$ is favoured because this allows a relatively high concentration of transition metal ions without clustering effects and additionally broadens the rare-earth absorption bands compared to the use of a pure silica host. There is generally a need to compromise on the concentration of Al since delta n rises with increasing Al concentration, leading to smaller core diameter, as does rare earth solubility. To provide sufficient attenuation between 1.5–1.6 µm and concomitant transparency in the 1.3 µm window, the lanthanide ions were considered to be the most suitable dopants. Other possibilities e.g. first row transition metals were found to have absorption bands which were too wide for this application. After examining various possibilities, it was concluded that the most suitable combination of dopants for the present purpose were erbium, utilising the ground state $\rightarrow {}^4I_{13/2}$ transition, which provides the bulk of the attenuation and neodymium with the ground state $\rightarrow {}^4I_{15/2}$ resonance. Although this latter band is weak and is centred around 1.6 µm, the high energy tail provides additional absorption in the long wavelength region of the 1.5 µm window. We found that doping levels of 0.25 and 1.0 wt percent erbium and neodymium respectively provided sufficient absorption in 2 m of fibre without incurring a measurable loss at 1.3 µm. This fibre length was convenient for handling purposes, however it would also be possible to increase the dopant level and reduce the fibre length, should this be desirable. At this concentration, $Nd^{3+}$ gives an attenuation of about 8 dB/m at 1600 nm. $Er^{3+}$ gives an attenuation of about 2.2 dB/cm/wt percent at 1540 nm. We have used total rare earth dopant levels of up to 7 wt percent without any clustering problems. (For a core glass of silica doped with about 6 wt percent Al and 0.5 wt percent P, clustering was first observed with a total rare earth dopant level of 15 wt percent. Should one wish, one could of course use lower doping levels and increase the fibre length used. The disadvantage of lower doping levels is that for a given level of attenuation, more fibre needs to be stored. Clearly with this type of filter the very advantageous property of selecting the level of attenuation can be accomplished by simply adjusting the fibre length.

Initial experiments were carried out with fibre filters the core size of which was about 6 microns which is slightly smaller than that of the standard fibre (8 microns) used in the network. This allowed the fibre to be wound into loops of ~3 cm diameter without bend loss, reducing packaging space— an important consideration since normally the filters will be sited in the customer's premises. To allow these fibre filters to be spliced to system fibre with low loss and low back reflections, a modified fusion splicer (of the type described in the paper by Mortimore and Wright, Electronics Letters, vol. 22, No. 6, 1986, pp 318–319) was used which tapered the splice. For a filter with ultra-low loss in the passband, the filter fibre's mode field radius should match that of the system fibre to which the filter will be spliced. The minimum acceptable bend radius will then be substantially the same as that of the system fibre. The advantage of such a fibre filter is that splicing can be performed with a standard fusion splicer, without the need to taper the splice.

1.92 m of the experimental doped fibre (with a core diameter of 6 μm), approximately 0.25 wt percent erbium, and approximately 1.0 wt percent neodymium in an $Al_2O_3$ (3 wt percent Al)—$SiO_2$ core glass (no P doping)) was spliced between two lengths of system fibre. A cut-back method was then used to measure the spectral attenuation of the fibre filter. FIG. 1 plots the attenuation, including the loss of the two splices. The fibre filter provided 25 dB attenuation from 1465 to 1580 nm. Additional attenuation could be obtained simply by using a longer length of doped fibre. The loss at 1300 nm was extremely low at 0.89 dB. The back reflection of the fibre filter was measured at −39.6 dB at 1500 nm and −55.36 dB at 1300 nm.

Figure 2:
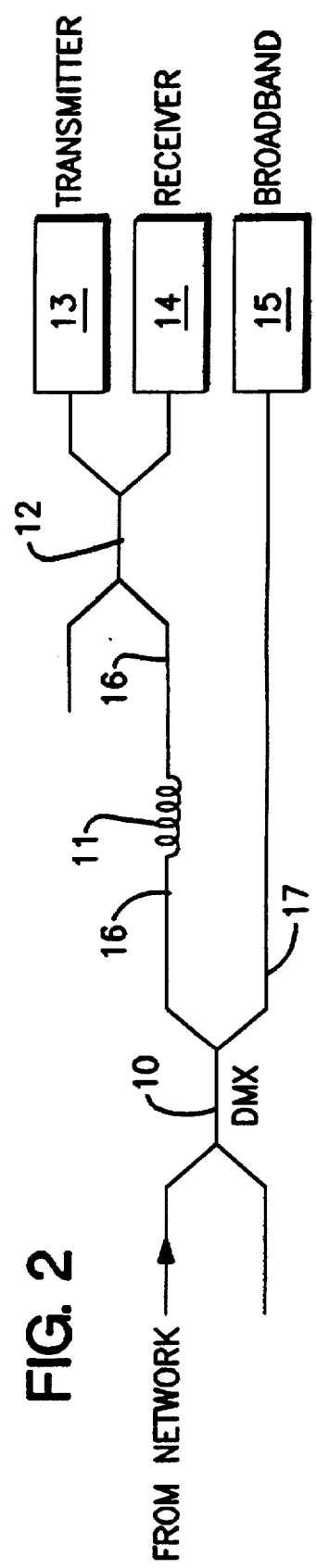
FIG. 2 is a schematic diagram of a PON.

FIG. 2 shows the arrangements of a terminal which contains a fibre filter 11 in accordance with the invention. Such a terminal can be used either at customer's premises or at an exchange.

The terminal is connected to a network by means of an DMX10 which separates a telephony frequency onto fibre 16 and a broadband frequency onto fibre 17. As an alternative, the separated signals in fibre 17 may also comprise several different frequencies, whereby the broadband services are also a FDM. Fibre 17 is connected to broadband terminal 15 which may include both send and receive functions. If necessary the broadband terminal 15 also includes further demultiplexers (not shown) and further fibre filters in order to attenuate unwanted frequencies. Fibre 16 includes a fibre attenuator 11 which leads to a directional splitter 12 which sends received signals to the receiver 14 and returns transmitted signals from the transmitter 13 into the network.

Fibre filter 11 is needed for the following reason. DMX 10 is likely to be imperfect and, therefore, signals at broadband wavelength may also be fed into the fibre 16. These signals would have an adverse effect upon the receiver 14. Therefore, filter 11 contains a dopant which absorbs the broadband signals whereby these signals are attenuated to an acceptable level. When a network is upgraded from single frequency operation, it is necessary to fit a demultiplexer 10 and it is convenient that the fibre filter 11 is supplied already fitted to the output port 16.

Figure 3:
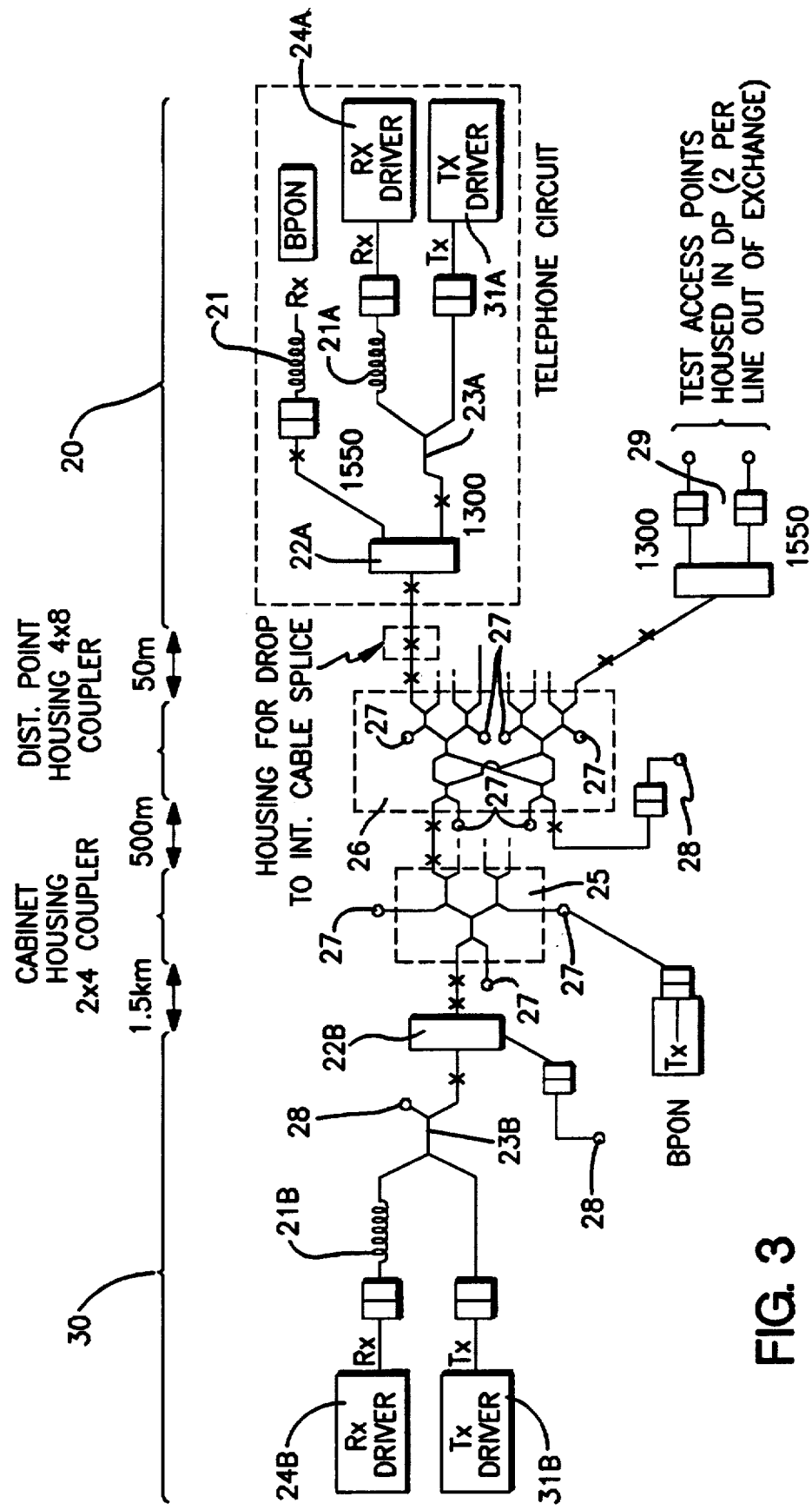
FIG. 3 is a schematic diagram of the alternative arrangement of a customer's termination equipment.

FIG. 3 shows in diagrammatic form a network arrangement operating on a frequency division multiplex. FIG. 3 includes the exchange equipment 30, and it shows only a single customer's equipment 20 although it should be realised that the customer's equipment 20 will be replicated as many times as there are customers. The exchange 30 is connected to all the customers' premises via distribution couplers 25 and 26 which provide for the plurality of customers. The exchange is intended to provide telephony at 1300 nm. The broadband services at 1550 nm can be coupled at ports 27 which are also located in the couplers 25 and 26. Broadband equipment is not illustrated.

The system also provides ports 28 for coupling fault location equipment, and it is desirable to provide test access point 29 which provides access points for both 1300 nm and 1550 nm services.

The telephony arrangements are substantially the same at both the exchange 30 and the customer's premises 20. Equipment at the customer's premises is differentiated by the suffix "A" whereas equipment at the exchange 30 is differentiated by the suffix "B". Since the two sets of equipment are substantially the same, these suffixes will not be used in the description.

The equipment, at both exchange and customers' premises, comprises a demultiplexer 22 which separates the broadband services at 1.55 μm from the finished services at 1.3 μm. Telephony services are connected to terminals via a directional coupler 23, which separates incoming signals to the receiver 24 via a filter 21. The filter 21 is a doped fibre which attenuates signals within the 1.55 μm band. The doped fibers may each, for example, have a length of 0.1 to 20 meters. The transmitter 25 is connected directly back to the network via the directional splitter/coupler 23. It will be appreciated that the directional splitter/coupler 23 makes it possible to provide duplex services in the network. It should also be noted that the arrangement at FIG. 3 differs from the arrangement at FIG. 2 in that the filter 21 only attenuates signals passing through the receiver 24. The signals generated by the transmitter 25 do not contain unwanted frequencies and, therefore, it is unnecessary that they be subjected to the attenuation of the fibre filter.

In order to provide adequate isolation for the telephony service a rejection of 36 dB is required for the 1500 nm region. This rejection is necessary because the received 1500 nm power is likely to be far higher than the equivalent 1300 nm power. The WDM provides rejection of approximately 11 dB over the wavelength range leaving a further 25 dB to be found from the filter.

The position of the filter 11 in FIG. 2 is advantageous because it provides isolation for both the receiver and the transmitter. This filter position also means that the transmitter/receiver could be a standard duplexing unit. The filter position requires that it provides a return loss of at least 50 dB at 1550 nm. This is very difficult to achieve in a duplex network using a conventional multilayer interference filter. It is also important that the transmission loss of the filter component at the "pass" wavelength region (here 1300 nm) is kept to a minimum as the loss of the network is already high. Within this application the requirement would be for one filter per customer's premises and consequently the cost and the insertion loss of this device must be very low.

The above examples have been directed to filters which block the 1.55 μm window while leaving the 1.3 μm window substantially unattenuated. The opposite function, that is blocking the 1.3 μm window while leaving all or part of the 1.55 μm window substantially unattenuated, is more difficult to achieve with rare-earth dopants. However, dysprosium may be satisfactory for some applications since although the tail of the $^6H_{11/2}$ peak provides absorption above about 1.55 μm the $^6H_{9/12}$ peak is much stronger and provides significantly high absorption in the 1.3 μm window. This is particularly the case in fluoride glass fibres. Thus although the ultimate performance of such a filter may be inferior to that of one designed to pass 1.3 μm and block 1.55 μm, because the minimum loss in the passband is higher, acceptable performance should still be achievable. Clearly with this dopant one does not want to broaden the absorption bands, and hence the glass composition should be adjusted accordingly (avoiding the use of both phosphorus and aluminium). Suitable doping levels are in the range 0.55 to 1 weight percent. The absorption spectra of the first row transition metals are too broad for this application.

One can, however, use doped fibre as filters within the 1.55 μm window. For example the short wavelength end of the 1.55 μm window could be blocked using $Er^{3+}$ ions, the attenuation peak being kept narrow by not using $Al_2O_3$ as a co-dopant. Alternatively, the long wavelength end of the 1.55 μm window could be blocked using $Nd^{3+}$ ions and $Tb^{3+}$ ions, again avoiding the use of $Al_2O_3$ as a co-dopant.

Additionally, the preceding discussion and examples have concentrated on silica-based fibres. Of course it is not an essential feature of the present invention that such fibres be used. For example, fluoride fibres can readily be doped with rare-earth and other ions, as is well known from the field of fibre lasers and fibre laser amplifiers.

The disadvantage of using fluoride fibres is that it currently precludes fusion-splicing to systems fibres, since such fibres are exclusively silica-based. Reasonably low-loss joint can be achieved using adhesive secured or other mechanical splices, but typically the losses are higher than those achievable with fusion splicing. A component of the increased loss is an increase in reflection at the splice site, and this is undesirable. A fluoride fibre filter could be provided with silica fibre tails, for example by adhesive splicing, so that the filter could be fusion spliced in the field to silica systems fibres.

Clearly the invention is not just applicable to single-mode fibres, but is also applicable to multi-mode fibres.

A further option provided by the present invention is to use a suitably doped optical fibre as a filter for noise at a particular wavelength or wavelength bands. For example fibre laser amplifiers are optically pumped to produce the necessary population inversion. Ideally all the pump radiation is absorbed within the active fibre of the laser, but in practice some residual pump radiation frequently remains to be propagated with the desired output radiation. Routinely the pump radiation is at a wavelength relatively remote from the signal wavelength range, for example erbium fibre amplifies which offer useful outputs in the 1.55 μm window are pumped at many wavelengths between about 0;9 and 1.48 μm, but typically the shorter wavelengths, around 0.98 and 1.06, are used. With such short pump wavelengths it is possible to use ytterbium to absorb residual pump radiation while leaving both the 1.3 and 1.5 μm windows substantially unaffected. Ytterbium's heavy absorption in the 0.9 to 1.1 μm region means that filters only a few centimeters in length can provide high attenuation with only a low ytterbium concentration. Typically one would use between 0.5 and 5.0 wt percent, more typically 1 to 3 wt percent.

We claim:

1. In an optical telecommunications system utilizing wavelength division multiplex, an optical transmission path comprising an optical fiber and at least one optical fiber filter for attenuating signals at unwanted wavelengths, wherein the filter includes a passive optical fiber doped to absorb the unwanted wavelengths and to pass substantially unattenuated signals at desired wavelengths.

2. In an optical communications system, an optical transmission path system between a transmitter and a receiver in which said transmission path system comprises an optical fiber, which carries first information signals at a first wavelength $\lambda_1$ and second signals at a second wavelength $\lambda_2$, and an optical filter in the optical transmission path between said optical fiber and said receiver to filter out said second wavelength $\lambda_2$ without substantially affecting the first information signal received by said receiver at said first wavelength $\lambda_1$, wherein said filter comprises an optical fiber doped to adsorb at least 10 dB at the second wavelength $\lambda_2$.

3. In an optical telecommunications system, an optical pathway comprising a plurality of communications channels, wherein each channel corresponds to a different and distinct wavelength conveyed by the pathway, and a fiber filter doped to attenuate signals in at least one predetermined channel and to pass substantially unattenuated signals in at least one other of said communications channels.

4. An optical pathway as in claim 3 wherein the passive optical fiber filter is doped with rare earth ions.

5. An optical pathway as in claim 4 wherein said rare earth ions comprise $Er^{3+}$.

6. An optical pathway as in claim 4 wherein said rare earth ions comprise $Nd^{3+}$.

7. An optical pathway as in claim 4 wherein said rare earth ions comprise $Er^{3+}$ and $Nd^{3+}$.

8. An optical pathway as in claim 7 wherein said rare earth ions consists essentially of $Er^{3+}$ in a first one of said passive optical fiber filter and said rare earth ions consists essentially of $Nd^{3+}$ in a second one of said passive optical fiber filter.

9. An optical pathway as in claim 7 wherein the concentration of $Er^{3+}$ is greater than the concentration of $Nd^{3+}$.

10. An optical pathway as in claim 3 wherein the optical fiber filter is single mode.

11. In an optical communications system, an optical transmission path between a transmitter and a receiver comprising:

an optical fiber adapted to carry first information signals at a first wavelength and second signals at a second wavelength, and a passive optical fiber filter in said optical transmission path between said optical fiber and said receiver, wherein the optical fiber filter is doped to absorb said second wavelength without substantially affecting the information signals at the first wavelength received by the receiver.

12. An optical transmission path as in claim 11 wherein the optical fiber filter adsorbs at least 10 dB of said second signals at the second wavelength.

13. An optical transmission path as claimed in claim 11, wherein said second signals are information signals.

14. An optical transmission path as in claim 11 wherein said second signals are between 1.5 and is 1.6 μm.

15. An optical communications system comprising:

a transmitter for transmitting signals at first and second optical wavelengths;

a plurality of optical fibers each adapted to carry said first and second optical wavelengths to a plurality of subscriber premises, each of which premises has a receiver coupled to at least one said fibers, and a passive optical fiber filter at each of said subscriber premises and optically coupled to at least one of the optical fibers, said optical fiber passing without substantial attenuation the first wavelength and doped to attenuate the second wavelength by at least 10 dB.

16. An optical communication system as in claim 15 further comprising a receiver coupled to said passive optical fiber filter, and said receiver and the optical fiber filter are both located at a same subscriber premises.

17. An optical communication system as in claim 15 wherein the first wavelength is between 1.25 and 1.35 μm.

18. An optical communications system comprising an optical transmission path between a transmitter and a receiver, wherein said transmission path is adapted to carry first information signals at a first wavelength $\lambda_1$ and a second information signal at a second wavelength $\lambda_2$, wherein $\lambda_1$ is between 1.25 and 1.35 μm and $\lambda_2$ is between 1.5 and 1.6 μm, said receiver being connected to said path by a fiber tail, wherein a portion of the fiber tail is adapted to filter out said second wavelength without substantially affecting the signal level at said first wavelength, wherein said portion is doped with rare earth ions to provide an absorption of at least 10 dB at $\lambda_2$.

19. A system as claimed in claim 18, wherein said rare earth ions are $Er^{3+}$.

20. A system as claimed in claim 18, wherein said rare earth ions are $Er^{3+}$ and $Nd^{3+}$.

21. A system as claimed in claim 20, wherein the concentration of $Nd^{3+}$ ions is greater than that of $Er^{3+}$ ions.

22. A system as claimed in claim 21, wherein the concentration of $Nd^{3+}$ ions is at least twice that of $Er^{3+}$ ions.

23. A system as claimed in claim 18, wherein said portion is selectively doped to provide an absorption at $\lambda_2$ which is at least ten times an adsorption at $\lambda_1$.

24. A system as claimed in claim 18, wherein said portion is between 0.1 and 20 meters in length.

25. A system as claimed in claim 18, wherein the said portion is single mode.

26. A system as claimed in claim 18, wherein the receiver and the portion are located at a subscriber's premises.

27. An optical communications system as claimed in claim 26, wherein said transmission path further comprises a plurality of optical fibers carrying said first and second optical wavelengths, $\lambda_1$ and $\lambda_2$, to a multiplicity of subscribers' premises, and an optical fiber filter being provided at each of said multiplicity of subscribers' premises.

28. Terminal equipment of an optical telecommunications system utilizing a wavelength division multiplex at both a first wavelength $\lambda_1$ and a second wavelength $\lambda_2$, wherein $\lambda_1$ is between 1.25 and 1.23 μm and $\lambda_2$ is between 1.5 and 1.6 μm, said terminal equipment comprises a receiver having a fiber tail for connecting to said optical telecommunications system, and wherein at least a portion of said tail is doped with $Er^{3+}$ ions to absorb signals at $\lambda_2$.

29. Terminal equipment as in claim 28, wherein said portion of said tail contains both $Er^{3+}$ and $Nd^{3+}$ ions.

30. A demultiplexer suitable for use in an optical telecommunications system using a wavelength division multiplex at both a first wavelength $\lambda_1$ and a second wavelength $\lambda_2$, wherein $\lambda_1$ is between 1.25 and 1.35 μm and $\lambda_2$ is between 1.5 and 1.6 μm, wherein said demultiplexer comprises two fiber tails forming a first output port for signals at $\lambda_1$ and a second output port for signals at $\lambda_2$, wherein at least a portion of an optical fiber in said first output port contains $Er^{3+}$ ions as a dopant adapted to absorb signals at $\lambda_2$ and pass signals at $\lambda_1$.

31. A demultiplexer as in claim 30, wherein one of said tails contains $Er^{3+}$ and $Nd^{3+}$ ions.

\* \* \* \* \*